Dec. 1, 1936.   F. A. TRUESDELL   2,062,621
OIL ENGINE
Filed Oct. 10, 1930   6 Sheets-Sheet 1

INVENTOR
Fred A. Truesdell
BY
Evans & McCoy
ATTORNEYS

Dec. 1, 1936.  F. A. TRUESDELL  2,062,621
OIL ENGINE
Filed Oct. 10 1930  6 Sheets-Sheet 3

INVENTOR
Fred A. Truesdell
BY
Evans & McCoy
ATTORNEYS

Dec. 1, 1936.  F. A. TRUESDELL  2,062,621
OIL ENGINE
Filed Oct. 10, 1930  6 Sheets-Sheet 4
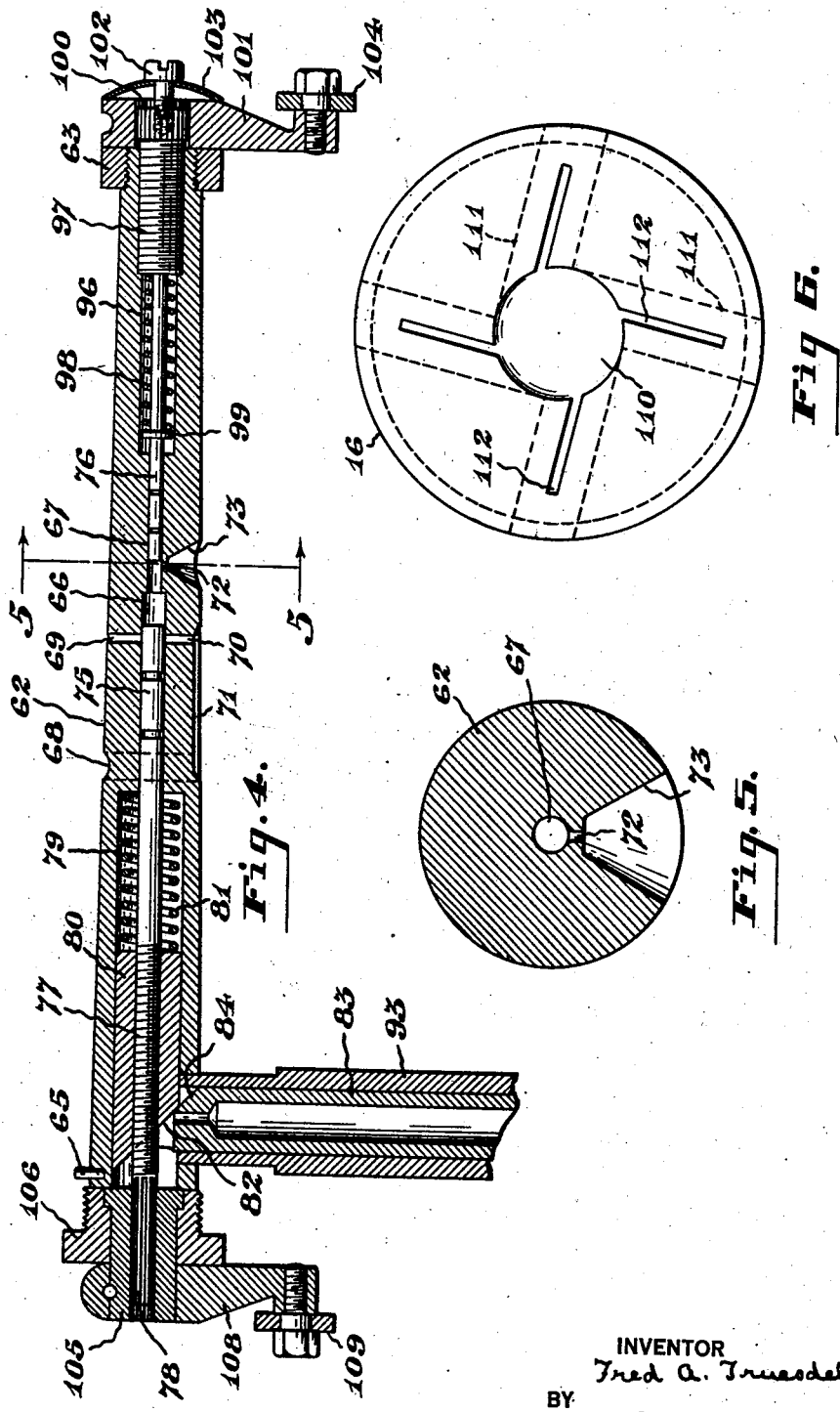
INVENTOR
Fred A. Truesdell
BY
Evans & McCoy
ATTORNEYS Dec. 1, 1936.    F. A. TRUESDELL    2,062,621
OIL ENGINE
Filed Oct. 10, 1930    6 Sheets-Sheet 5

INVENTOR
Fred A. Truesdell
BY
Evans & McCoy
ATTORNEYS

Patented Dec. 1, 1936

2,062,621

UNITED STATES PATENT OFFICE 2,062,621

OIL ENGINE

Fred A. Truesdell, Cleveland Heights, Ohio

Application October 10, 1930, Serial No. 487,771

5 Claims. (Cl. 123—65)

This invention relates to oil engines of the compression firing type and has for its object to provide a high speed engine of the type referred to, which is reliable in operation, simple in construction, and inexpensive to manufacture.

A further object of the invention is to provide a simple and efficient means for blowing air into the cylinders to scavenge the same and to provide oxygen to support combustion of the fuel charges, means being provided for blowing the air into the cylinders in such a manner as to produce a turbulence within the cylinder of a character such as to thoroughly scavenge the cylinder and effect a more complete diffusion of the fuel through the air in the cylinder when the fuel is blown into the cylinder.

A further object of the invention is to provide improved means for blowing air into the cylinders at a constant pressure in which the air is delivered to the cylinder by means of a pump actuated by the engine crank shaft, the pump being so designed as to maintain a constant pressure in the manifolds communicating with the engine cylinders.

A further object of the invention is to provide means for starting and stopping the engine by simultaneously controlling the fuel feed and air blowing devices in such a manner as to simultaneously discontinue the injection of fuel and cut off the supply of fresh air to the cylinders to bring the engine to a stop, and to admit air to the cylinders to scavenge the same prior to ignition of charges of fuel in the cylinder.

With the above mentioned objects in view and others which will appear as the description proceeds, the invention may be said to comprise the engine as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of this specification in which:

Fig. 4 is a sectional view of one of the injector units on an enlarged scale;

Fig. 5 is a section taken on the line indicated at 5—5 in Fig. 4, the scale being enlarged to show the form of the outlet orifice;

Fig. 6 is a top plan view of one of the pistons.

In the accompanying drawings, the invention is illustrated as applied to a two-cycle engine of a type suitable for propelling motor vehicles, boats, locomotives, etc. While the main features of the present invention are applicable to engines of various types and of various standard constructions, I prefer to employ cylinders constructed as separate units instead of cylinders formed in an integral block, as is now the usual practice.

Figure 1:
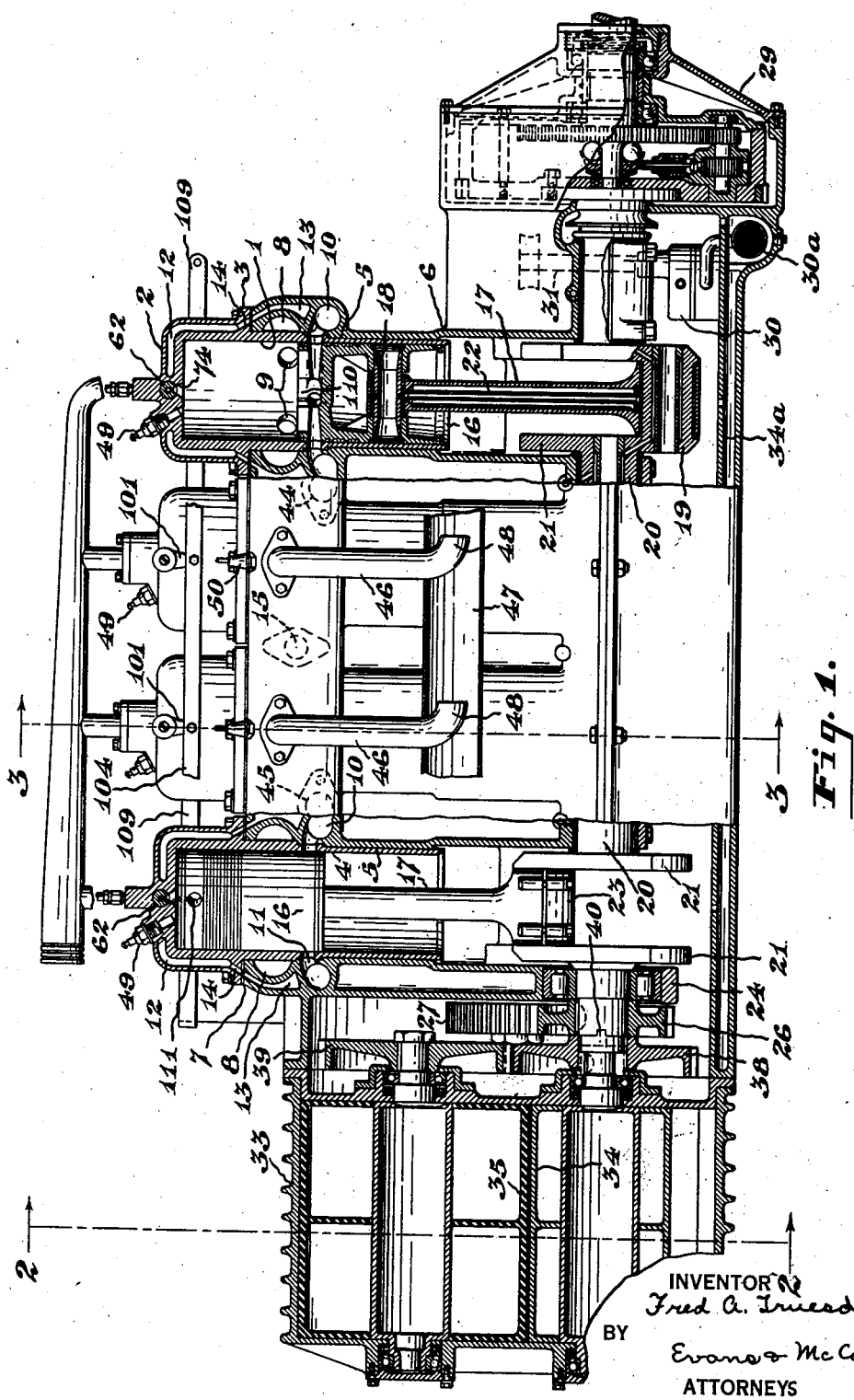
Figure 1 is a sectional elevation of an engine embodying the invention, the center cylinders of the engine being shown in side elevation and the end cylinders and portions of the engine adjacent thereto being shown in central vertical section.
Figure 3:
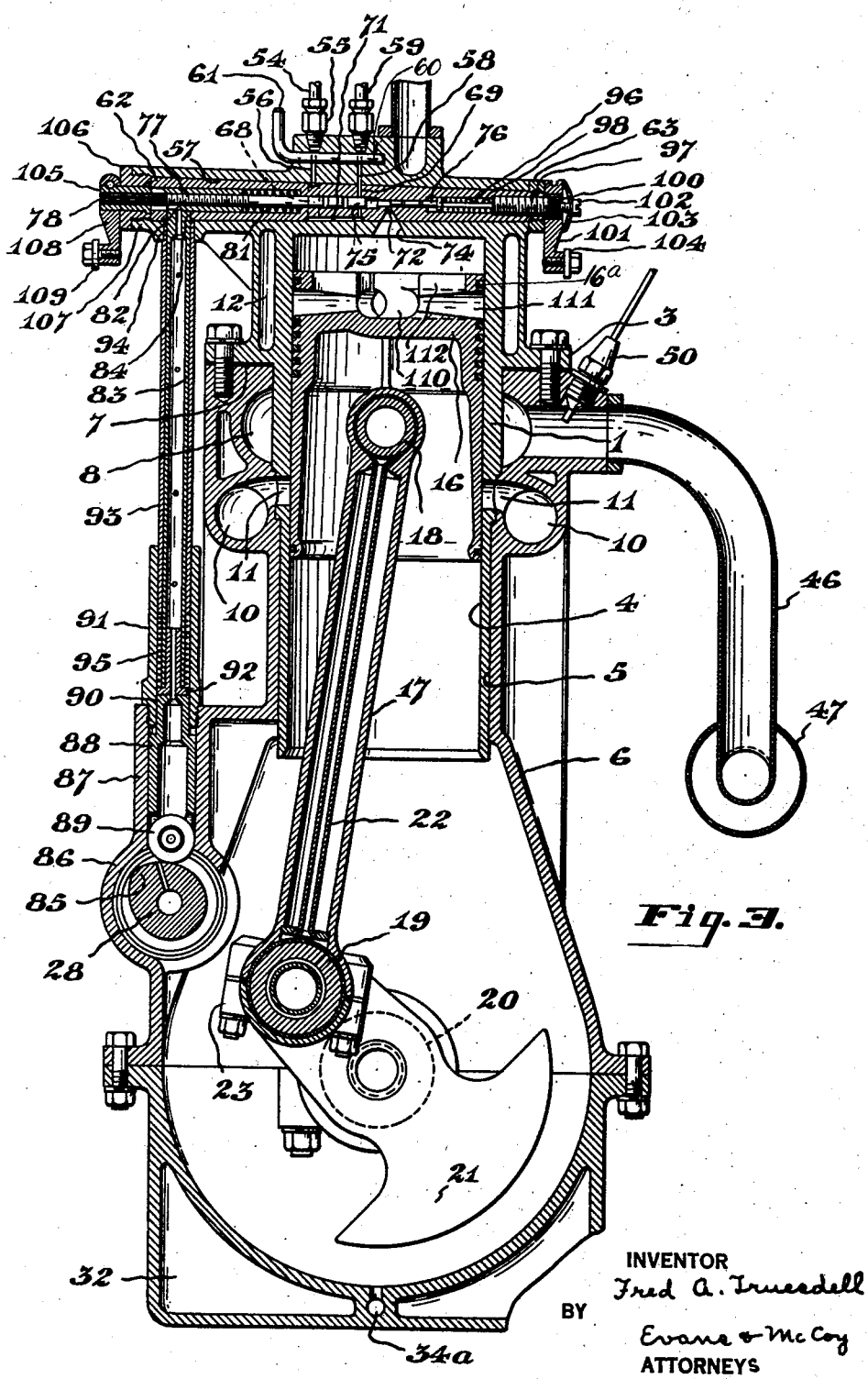
Fig. 3 is a section taken axially through one of the cylinders on the line indicated at 3—3 in Fig. 1.

As shown in Figs. 1 and 3, each cylinder 1 is a separate unit having an enlarged integral head 2 at its upper end which is provided a short distance below the top thereof with a circumferential attaching flange 3. The cylinders are preferably identical in form and interchangeable, the body portion of each cylinder below the head 2 thereof being in the form of a relatively thin cylindrical shell 4 adapted to fit in any one of a series of bores 5 formed in the upper portion of a crank case casting 6 which is preferably formed of an aluminum alloy. Flat seats 7 are formed upon the top of the casting 6 around the upper ends of the bores 5 to receive the attaching flanges 3 of the cylinders which are bolted to the top of the casting 6. The casting 6 is cored to provide exhaust passages 8 around each of the cylinders which communicate with the interior of the cylinders through ports 9 in the walls of the cylinders below the exhaust passages 8, the crank case being cored to provide air passages 10 around each of the cylinders which communicate with ports 11 in the walls of the cylinders.

The enlarged heads 2 of the cylinders are provided with water jacket chambers 12 and the casting 6 is provided with water jacket chambers 13 which surround the exhaust passages 8. The water jacket chambers 12 and 13 communicate with each other through passages 14 formed in the heads and crank case casting and extending through the seat 7. Any suitable water circulating system may be employed for cooling the engine, the water pump being shown at 15 in Fig. 2.

By constructing the crank case with an upper integral portion to receive and support the cylinders and with water jackets for the individual cylinders, the weight of the engine may be greatly decreased and the cost of manufacture materially reduced, at the same time greatly increasing the strength.

Furthermore, by constructing the cylinders as individual units, a damaged cylinder may be removed and replaced at small cost.

The cylinders are provided with pistons 16 adapted to be operated by connecting rods 17 which are of tubular form and pivotally connected at their opposite ends to wrist pins 18 of the pistons and to the crank pins 19 of the engine crank shaft 20.

The crank shaft 20 may be provided with counter weights 21 opposite the crank arms in accordance with the usual practice, and the connecting rods 17 may be provided with aluminum oil feed tubes 22 for delivering lubricant to the wrist pin bearings. The connecting rods 17 are detachably connected to the crank pins 19 by means of detachable bearing caps 23 and the crank shaft may be supported in the crank case by means of detachable bearing caps 24.

In order to properly time the delivery of fuel charges into the cylinders with respect to the strokes of the pistons, it is desirable that the fuel feed system be controlled by mechanism driven from the engine crank shaft. As shown herein, the crank shaft 20 has fixed thereto at one end a gear 26 which meshes with a gear 27 on a cam shaft 28 which is mounted in the crankcase and extends along one side thereof.

The crank shaft 20 may also be coupled to a suitable alined power shaft by means of a suitable torque converter 29.

The crank shaft and connecting rod bearings may be lubricated by means of a suitable force feed system, in which oil is forced under pressure into all of the bearings, as well understood in the art. As shown herein, a lubricant pump 30 may be mounted in the crank case adjacent the rear end thereof, see Fig. 1, and this pump may be operated by a shaft 31 which may be driven from the cam shaft 28 to pump oil from a reservoir 32, see Fig. 3, and deliver the same through suitable pipes (not shown) to the crank shaft bearings, from which the lubricant is delivered through suitable passages in the arms of the crank shaft to the crank pin bearings and from the crank pin bearings through the feed tubes 22 to the wrist pin bearings.

Oil dripping from any of the bearings is collected in a sump or channel 34ª extending along the bottom of the crank case and is pumped by a pump 30ª into the crank case reservoir 32 to keep the crank case substantially dry.

At the forward end of the crank case, there is shown a blower casing 33 which houses a blower of the gear type capable of delivering air at a rate substantially proportional to its speed of operation. The blower comprises two rotor elements 34 and 35 which have the form of intermeshing gears. One of the rotor elements, 34, is formed of an alloy steel preferably the alloy known as nitralloy in which a certain percentage of nitrate is included in the composition and the other rotor element, 35, is formed of a suitable rubber composition such as graphite rubber. The gear shaped rotors 34 and 35 have intermeshing teeth 36, the interengaging faces 37 of which are formed with a high angle of obliquity or pressure angle, preferably about 30°, in order to reduce slippage and wear due to slippage between the intermeshing teeth. By providing intermeshing gear shaped rotor elements formed, one of steel and the other of a rubber composition, a gear pump is provided which is practically noiseless in operation and which is capable of handling an elastic fluid such as air with a minimum of leakage. To further reduce the noise of operation, the rotor elements 34 and 35 may be driven by steel gears 38 and rawhide gears 39 which are fixed to the shafts of the two gear shaped rotor elements, one of said shafts being connected by a suitable key coupling 40, preferably an Oldham coupling with the forward end of the engine crank shaft 20.

The pump casing 33 is provided with an air inlet 41 which may be provided with a suitable air cleaner 42, through which the air is drawn from the atmosphere and with an outlet pipe 43 which has passages 44 and 45 leading to the passages 10 surrounding the cylinder from which air is intermittently admitted into the cylinders to scavenge the same.

Exhaust pipes 46 connect the exhaust passages 8 of the cylinders with a combined exhaust manifold and muffler 47, each of the pipes 46 having a bent end 48 within the manifold 47 directing the exhaust gases toward the discharge end of the manifold, so that the flow of exhaust gases from each of the pipes 46 has an entraining action on gases in all the other pipes 46 reducing the pressure therein.

Heater plugs 49 may be mounted, one in the upper end of each cylinder to assist in firing the charges of fuel by compression in starting the engine, as is common practice in engines of the compression firing type. A thermo-couple 15 of old and well known construction may be mounted in the exhaust passage and may be used to determine the proper timing of fuel injections and in obtaining proper regulations of the quantity of fuel delivered into the individual cylinders by adjustment of parts of the fuel feeding system supplying fuel to the cylinders.

Figure 2:
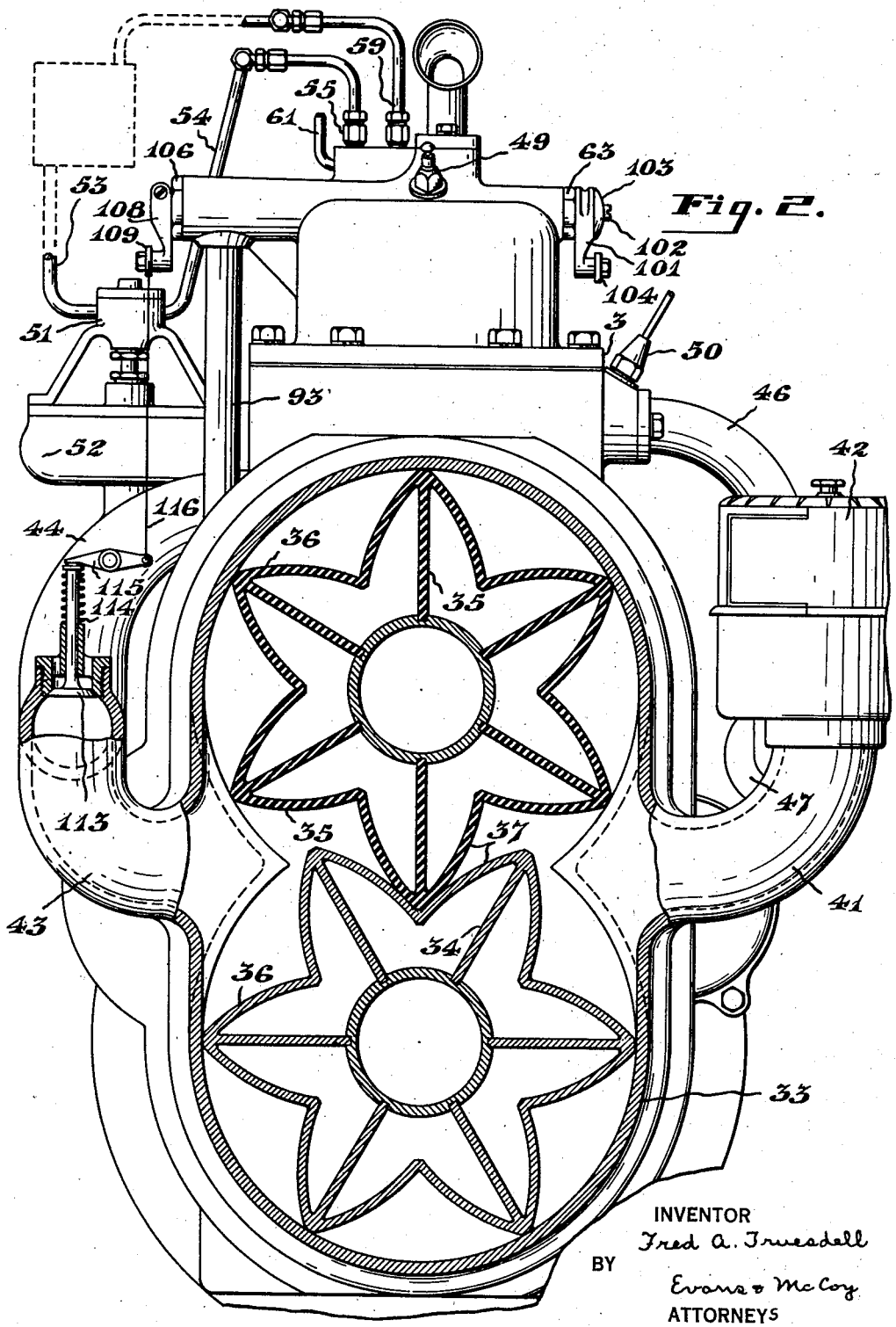
Fig. 2 is a section taken on the line indicated at 2—2 in Fig. 1 looking in the direction indicated by the arrows.

The fuel feeding system of the present invention includes an injector device on each of the engine cylinders and means for maintaining a constant supply of fuel to the injectors. A small pump of any suitable construction such as a gear pump may be employed to deliver the fuel to the injectors at a rate sufficient to meet the fuel requirements of the engine and under a pressure sufficient to insure an uninterrupted flow to the injector devices. The fuel pump may be driven in any suitable manner, preferably by suitable gearing from the engine crank shaft. As shown in Fig. 2 of the drawings, a fuel pump 51 is mounted above the water pump 52 and may be operated by the shaft of the water pump. A pipe 53 extends from the inlet side of the pump 51 to a fuel storage tank, and pipes 54 extend from the outlet side of the pump 51 to the individual cylinder heads, each of the pipes 54 being connected by a suitable fitting 55 to the top of the cylinder head 2 to deliver into a vertical passage 56 which extends from the top of the head 2 to a tapered bore 57, which extends transversely through the head 2 and provides a housing for an injector device which will presently be described.

The second vertical passage 58 extends from the top of the head 2 to the bore 57 and this second passage is connected by a pipe 59 to the fuel tank. Between the bore 57 and the top of the head, there is a transverse bore 60 extending from one side of the head parallel with the bore 57 and terminating within the head which extends across and communicates with the two vertical passages 56 and 58. A valve 61 is mounted in the bore 60 of each cylinder head by means of which the passages 56 and 58 may be closed to cut off the supply of fuel to the cylinder to permit repair of the fuel injecting device of a cylinder without stopping the engine.

The tapered bore 57 of each cylinder head receives a tapered sleeve 62 which extends through the head and is rigidly secured in the head by means of a clamping nut 63 on the small end of the sleeve.

At its large end, the sleeve is provided with a projecting pin or key 65 which fits in a slot at the large end of the tapered bore 57 to accurately position the tapering sleeve with its ports in registry with the passages of the cylinder head. The sleeve 62 is provided with a bore 66 extending from the larger end and with a bore 67 of smaller diameter extending from the smaller end, the bore 67 opening into the larger bore 66 near the longitudinal center of the sleeve. The sleeve 62 has an external groove 68 which registers with the vertical fuel inlet passage 56 and is also provided with an upwardly opening port 69 establishing communication between the bore 66 and the outlet passage 58. The sleeve 62 also has a downwardly opening port 70 directly opposite the port 69 which opens into a longitudinal groove 71 on the under side of the sleeve, which extends from the groove 68 to the port 70, so that an inlet passage is formed through the grooves 68 and 71, and port 70, and an outlet passage is formed through the port 69 and outlet passage 58. The smaller bore 67 opens through an injection orifice 72 to a downwardly flaring recess 73 on the under side of the sleeve which registers with a downwardly flaring opening 74 in the cylinder head which is located at the axis of the cylinder. As shown in Fig. 5 of the drawings, the edge of the injection orifices at the inner end thereof is preferably chamfered so as to obtain a freer and more uniform flow of fuel through the orifice during the injection period. The chamfering of the inner end of the orifice 72 may be done with a special tool inserted through the orifice.

A very important feature of the present invention is the means provided for delivering minute accurately measured charges of fuel at predetermined intervals into each of the cylinders. The feed of fuel to the firing chamber of each cylinder is effected by a power operated reciprocating plunger 75 which operates in the larger bore 66 of the tapering sleeve 62, and which during its stroke, moves inwardly and outwardly past the ports 69 and 70 to open and close the same. Co-operating with each plunger 75, there is an orifice closing plunger 76 mounted in the smaller bore 67 which is actuated by the pressure of the liquid trapped between the two plungers and moves from a position in which the plunger covers the orifice 72 to a position in which the orifice 72 is open.

When the plunger 75 is in its outermost position, the port 70 is open and fuel is forced by the fuel pump 51 from the inlet passage 56, grooves 68 and 71, and port 70 into the bore 66 to fill the space between the plungers 75 and 76. The plunger 76 is at this time in its innermost position closing the orifice 72. As soon as the plunger 75 moves past the ports 69 and 70, a body of liquid is trapped between the plungers 75 and 76 and, upon further movement of the plunger 75, the plunger 76 is moved outwardly and opens the port 72, through which the fuel is then injected into the firing chamber. Since the plungers of the several cylinders are operated in succession, the idle period for each plunger during which the ports 69 and 70 are open is much longer than the period during which these ports are closed. Consequently, the fuel forced under pressure through the inlet port 70 into the bore 66 and out through the passage 68 will completely wash out any gas which may have accidentally escaped from the engine cylinder through the injection orifice during the interval in which this orifice is open.

Toward its outer end, the plunger rod 75 is provided with a threaded portion 77 and outwardly of the threaded portion with a splined outer end portion 78. The sleeve 62 has a counter bore 79 extending inwardly from its larger end. This counterbore receives a guide block 80 which is screwed onto the threaded portion 77 of the plunger 75, the guide block 80 having a sliding fit in the counterbore 79. The plunger 75 is yieldingly pressed toward its outermost position by a coil spring 81 interposed between the bottom of the counterbore 79 and the inner end of the block 80. The guide block 80 has a flat outer end face 82 which is inclined at substantially 45° to its axis and the plunger 75 is moved inwardly in opposition to the spring 81 by means of a vertically disposed lifter rod 83 which is actuated at definitely timed intervals to operate the plunger, the rod 83 having an upper end face 84 inclined at 45° to slide upon the inclined end face 82 of the guide block.

The lifter rods 83, one for each cylinder, are mounted directly over the cam shaft 28, and are actuated by means of cams 85 which are enclosed in a housing 86 which may be formed integrally with the crank case. The housing 86 is provided with upwardly extending tubular guide portions 87 in which are mounted plungers 88 having rollers 89 at their lower ends engaging with the cams 85. Each plunger 88 has an upper end portion 90 of reduced diameter which fits within a guide sleeve 91 which is provided with a shouldered lower end screwed into the upper end of the tubular guide portion 87 of the casing. The lifter rod 83 has an enlarged lower end 92 which fits within the guide sleeve 91 and rests upon the upper end of the plunger 88. The upper portion of the lifter rod 83 has its sliding fit in a second guide sleeve 93 which has a shouldered upper end fitting in an opening 94 in the cylinder casting and which has a telescopic fit within the guide sleeve 91 at its lower end. The guide sleeve 93 is supported by a coil spring 95 which is interposed between the lower end of the sleeve 93 and the enlarged lower end 92 of the lifter rod. The spring 95 thus not only serves to hold the sleeve 93 in position, but also serves to exert a yielding pressure on the lifter rod 83 and plunger 88 to maintain the rollers 89 in engagement with the cams 85.

Any one of the lifter rods can be quickly and easily detached and may be removed while the engine is running, if desired. To remove the rod, it is necessary to telescope the guide sleeves 91 and 93 by unscrewing the lower sleeve 91 and moving the same upwardly, a sufficient distance to clear the upper end of the plunger 88 and then to move the upper sleeve 93 downwardly against the spring 95 until its upper end is clear of the cylinder casting, whereupon the lifter rod may be removed laterally, the disengagement of the upper end of the sleeve 93 from the opening 94 allowing the lifter rod to rock sufficiently in the opening to permit its lower end to be moved outwardly off the upper end of the plunger 88.

The smaller end of the tapered sleeve 62 is provided with a counter bore 96 extending inwardly from said end, and the outer portion of this counter bore is threaded to receive a threaded plug 97 which provides an adjustable stop for positively limiting the movement of the orifice closing plunger 76. The counter bore 96 also provides a housing for a coil spring 98 which is interposed between the inner end of the plug 97 and a flange 99 on the plunger rod 76. The spring 98 exerts a yielding pressure on the plunger 76 to normally hold the same in its innermost position in which the inner end of the plunger projects a considerable distance past the injection orifice 72 to positively close the same.

It will be apparent that by adjusting the threaded plug 97, the extent of movement of the plunger 76 may be varied to vary the volume of fuel injected into the firing chamber. Since the volume of fuel injected into the firing chamber by one stroke of the plunger 75 is exactly equal to the reduction in volume of the chamber between the plungers 75 and 76, after the plunger, 76 has come to a stop, and, since the cross sectional area of the plunger 76 is much less than that of the plunger 75, it will be apparent that very minute variations in the quantity of fuel injected into the firing chamber at each stroke of the plunger 75 may be effected by adjustments of the plunger 76.

The threaded plugs 97 are preferably connected for simultaneous actuation, each plug having a serrated outer end 100 which has a sliding fit in a serrated opening in a crank arm 101, the crank arms being secured to the plug by means of screws 102 threaded into the end of the plug and flat springs 103 which bridge the openings of the crank arms and the crank arms being connected by a suitable link 104 for simultaneous actuation. The fine regulation of the volume of the fuel charge by adjustments of the plunger 76 may be advantageously utilized to maintain predetermined speeds of operation by connecting the link 103 to a suitable speed controlled governor (not shown).

Each plunger 75 has a serrated outer end 78 which has a sliding fit within a serrated sleeve 105 which is journaled in a retaining nut 106 which is screwed into a threaded counterbore 107 at the large end of the tapered bore 57 in the cylinder head. The sleeve of each of the plungers 75 has fixed thereto a crank arm 108 and these crank arms may be connected by a link 109 for simultaneous actuation. Each of the plungers 75 rotates with the sleeve 105 to which it is splined, but is free to move longitudinally with respect to the sleeve. Consequently, when turning movement is imparted to a sleeve 105, the threaded portion 77 of the plunger is caused to turn within the guide block 80 and the plunger 75 is adjusted axially within the block.

The guide block 80 is held by its spring 81 in engagement with the inclined face 84 of the lifter rod and on each actuation of the lifter rod by a cam, a reciprocating stroke of predetermined length is imparted to the guide block and to the plunger 75 which moves with the block. By adjusting the plunger 75 with respect to its guide block, by means of the serrated sleeve 105, the distance which the plunger 75 projects beyond the inner end of the block 80 may be varied as desired to vary the distance past the inlet and overflow ports 70 and 69 which the plunger moves in its stroke. Regardless of the position of adjustment of the plunger 75, a predetermined volume of liquid is always trapped between the plungers 75 and 76 at the instant the plunger 75 has moved to a position closing the ports 69 and 70, and it will be readily apparent that the volume of liquid injected into the engine cylinder varies directly with the distance the plunger 75 moves past the ports 69 and 70. The volume of the charge injected into the engine cylinders may therefore be varied by angular adjustment of the serrated sleeves 105.

When a body of liquid which is incompressible is trapped between the two plungers, the plunger 76 must move in opposition to the coil spring 98 at a speed greater than that of the plunger 75, since the bore 66 in which the plunger 75 is mounted is of larger diameter than the bore 67 in which the plunger 76 is mounted. For instance, if the bore 67 has a cross sectional area one-half that of the bore 66, the plunger 76 must move twice as fast as the plunger 75. The plunger 76 is thus moved rapidly to a position clear of the injection orifice 72 and into engagement with the stop plug 97.

After the injection orifice 72 is opened and the plunger 76 brought against the stop, fuel will be injected into the engine under a pressure which is dependent upon the speed of movement of the plunger 75 and the cross sectional area of the injection orifice 72. By properly designing the plunger actuating cam with reference to the size of the injection port 72, a suitable injection pressure can easily be obtained.

It will be apparent that adjustments of a plunger 75 in its guide block 80 vary the volume of the charge to a greater extent than a corresponding adjustment of a plunger 76. The crank arms 101 and connecting link 104 will therefore be more convenient for manual operation to quickly vary the volume of the fuel charges to increase or decrease the speed of the engine and the crank arms 108 with the connecting link 109 may be operated independently by any suitable type of governor to automatically maintain the engine at a constant speed.

As the plunger 75 is adjusted to decrease the amount of fuel delivered at each stroke into the engine cylinder, there is a slight shortening of the time period during which the fuel is injected under pressure into the engine cylinder. There is a slight lag amounting to only a few degrees of the crank shaft travel, in the starting of the injections of fuel, but the time at which the plunger 75 reaches the forward end of its stroke and the injection of fuel ceases is always the same, regardless of the position of adjustment of the plunger 75.

The link and crank arm adjusting device for the injector plunger 75 is preferably adjustable to a position such that the plunger 75 does not move a sufficient distance past the ports 69 and 70 to move the plunger 76 past the injection orifice into engagement with its stop and the feed of fuel to the engine cylinders is discontinued.

The bores 66 and 67 in which the plungers 75 and 76 are mounted have a very small cross sectional area and consequently a relatively small pressure is required on the plunger to create the desired injection pressure. For instance, if the cross sectional area of the bore 66 is one-twentieth of a square inch, only about 250 lbs. pressure would be required on the plunger 75 to create an injection pressure of 5000 lbs. per square inch.

A further advantage of a plunger of small diameter is that the plungers have a longer stroke for delivering a given volume of fuel and moves farther past the inlet and overflow ports 70 and 69 before injecting the minute volume of fuel into the engine cylinder, insuring positive opening and closing of the ports and making possible very accurate regulation of the fuel charge. It should also be noted that during the interval between the closing of the ports 69 and 70 by the plunger 75 and the engagement of the plunger 76 with the stop plug 97, the pressure on the liquid between the plungers is only that imposed by the spring 98 and the liquid is subjected to the high injecting pressure only after the injection orifice 72 is fully open and after the plunger 75 has moved a substantial distance past the ports 69 and 70, so that danger of leakage due to pressure past the plunger 75 to the ports 69 and 70 is eliminated and the high injection pressure is exerted only during a very small fraction of a second while the plunger 75 is completing its pressure stroke and while the injection orifice 72 is fully open.

The movement of the plunger 75 is at all times at the same speed as that imparted to the lifter rod 83 by the cam 85 and, regardless of the adjustment of the plunger 75 in the guide block 80, the plunger is always actuated by the same portion of the cam 85 during the final fuel injecting portions of its stroke. Since the high pressure is exerted by the plunger 75 only during the final portion of its stroke, the pressure on the sliding faces 82 and 84 is relatively light during the initial portion of the stroke and the maximum pressure between the faces is exerted only while the faces have a large area in engagement. Consequently, the wear due to the frictional sliding engagement of these faces is very slight.

Effective scavenging of the cylinders after the firing of each charge, and the replacement of the dead gases with air is also a very difficult problem, particularly in designing engines of the compression firing type capable of operating at high speed. One of the most important objects of the present invention is the provision of an efficient, simple, and inexpensive scavenging device. Each piston 16 has a swirl pocket or chamber 110 formed within its head which opens to the firing chamber through the top of the piston. Each piston is also provided with a series of passages 111 leading from the swirl pocket 110 to the periphery of the piston to conduct air from the annular air passage 10 to the swirl pocket. The passages 111 are tangentially arranged with respect to the swirl pocket to impart a rapid whirling motion to the air delivered into the pocket. The passages 111 have narrow slots 112 opening through the top of the piston so that, after the air inlet and exhaust ports are closed, the air trapped in the cylinder and being compressed by the piston will enter the passages 111 through the slots 112 and the injected fuel will be thoroughly mixed with the air within the chamber and passages of the piston head as well as with the air above the piston. As shown in Fig. 3 of the drawings, the piston 16 is provided with piston rings, one of which 16a, is located between the top of the piston and the outer ends of passages 111. The piston ring 16a serves to prevent leakage of air around the periphery of the piston head into the passages 111 so that the large swirling volume of air trapped within the cylinder as the compression stroke proceeds, is driven over the top of the piston through swirl pocket 110 and slots 112, into passages 111, picking up the fuel injected through orifice 72 in the head of the cylinder, thus insuring a uniform mixture of fuel throughout the air which must be compressed into the small space of the swirl pocket and the passages in order to raise the temperature high enough to burn the mixture, thus insuring complete combustion. The piston ring 16a also serves to keep the upper portion of the cylinder wall lubricated and free from carbon.

In the operation of the engine, a charge of fuel is fired as the piston reaches the upper end of its stroke, causing a very rapid increase in the volume of gas and driving the piston down. During the final portion of its downward movement, the piston 16 first partly uncovers the exhaust ports 9, whereupon the major portion of the exhaust gases are discharged from the cylinder due to the high pressure of the gases in the cylinder and then as the piston travels farther down toward the lower end of its stroke and the exhaust ports 9 are more completely opened, the passages 111 of the piston are brought into full registry with the air inlet ports 11, whereupon air is forced under pressure into the swirl pocket 110 from which the air is discharged in a rapidly whirling column axially of the cylinder toward the top thereof. This rapidly whirling column of air impinging on the top wall of the cylinder spreads out and moves downwardly around the central whirling column, forcing the dead exhaust gases downwardly and out through the exhaust port, replacing the dead gases with a charge of air. While the piston is moving upwardly, closing the air injection ports 11 and exhaust ports 9, and, on continued movement compressing the air charge in the firing chamber, the air trapped within the cylinder will be in a state of turbulence or a rapid whirling motion, so that the finely atomized fuel injected into the cylinder during this portion of the piston stroke will be uniformly dispersed throughout the air in the cylinder and throughout the air in the swirl pocket 110 and passages 111 of the piston head.

In order to bring the engine to a quick stop when the fuel injector control device is thrown into off position and to insure proper scavenging of the cylinders upon restarting the engine, the blower system is preferably linked to the fuel injection control device to automatically discontinue the delivery of air under pressure to the cylinders when the injector control is moved to off position and to render the air injection device operative when the fuel injection devices are again restored to operative position.

The control of the blower system may be effected by means of a valve 113 in the blower outlet pipe 43, which valve 113 may be in the form of a poppet valve normally held in closed position by means of a spring 114, and adapted to be opened to relieve the pressure in the pipe 43 by means of an actuating lever 115. The actuating lever 115 may be operatively connected by any suitable means such as the wire 116 herein shown to the link 109 of the fuel injector controlling device. When the link 109 is shifted to throw the injector plungers to their off position, the lever 115 is automatically actuated to open the valve 113, so that the pressure in the air passages 10 is relieved and air will not be injected into the cylinder to replace the products of combustion. The cessation of the supply of air to the cylinders will cause dead gases to be trapped in the cylinders and prevent further firing. The valve 143 is automatically closed as the injector plungers are restored to operative position, and, upon restarting the engine, air is delivered under pressure to the cylinders to insure complete scavenging of the cylinders prior to the firing of initial charges of fuel therein.

Figure 7:
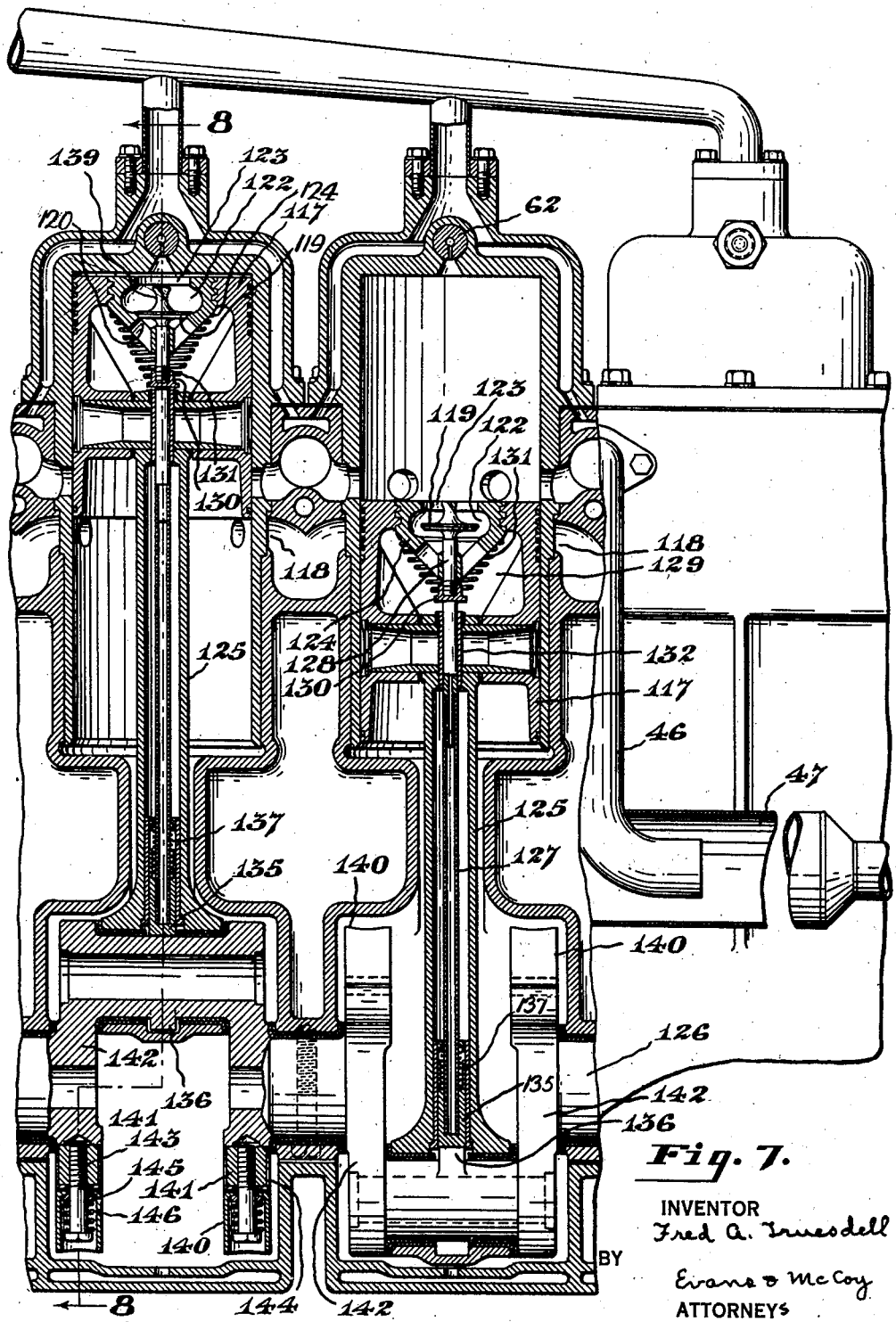
Fig. 7 is a central longitudinal vertical section showing a modification of the invention.
Figure 8:
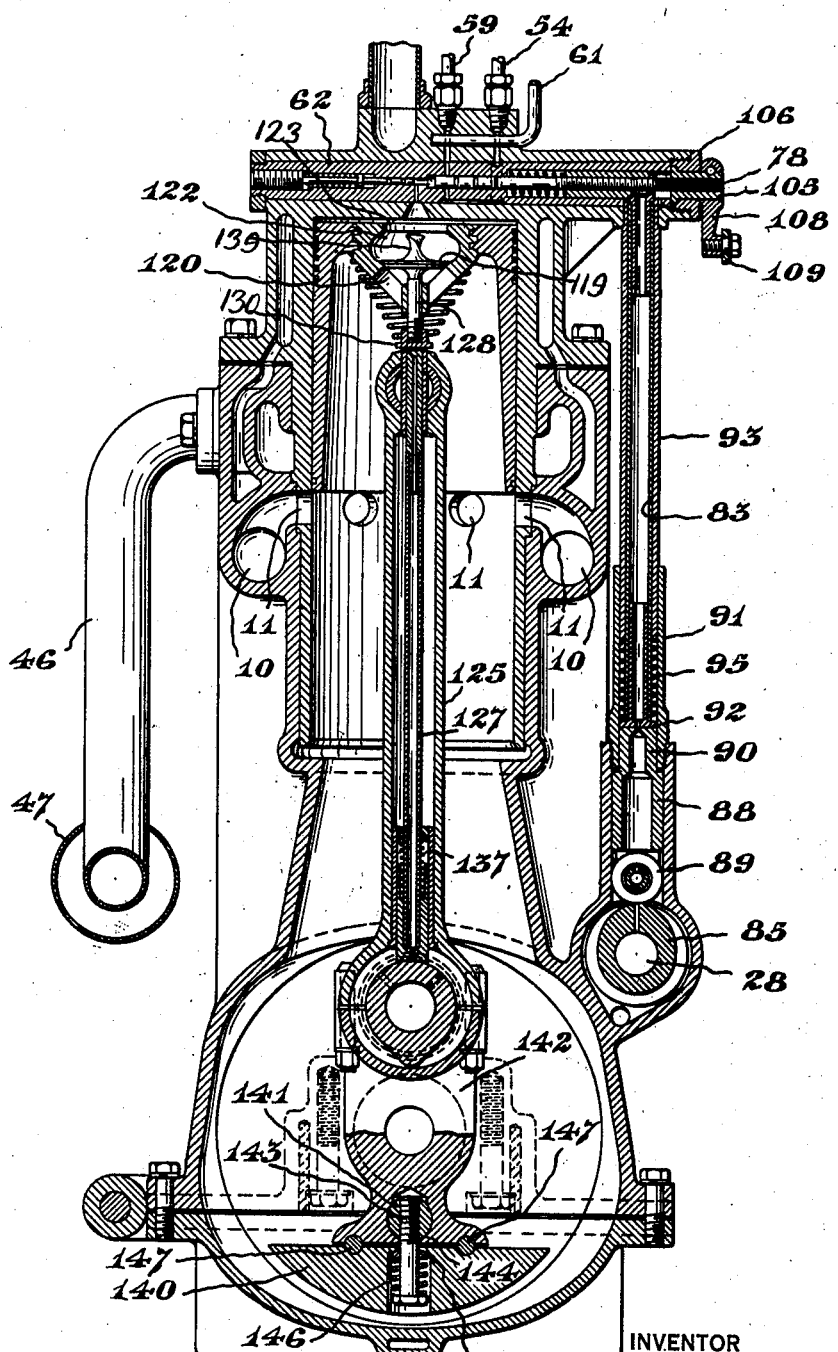
Fig. 8 is a section taken on the line indicated at 8—8 in Fig. 7.

In Figs. 6 and 7, there is shown a modification of the invention, particularly in the devices for injecting air into the cylinders. In this modification, the fuel injection system, the cylinder and crank case construction, and the exhaust connections are the same as in the modification first described, and these parts, which require no further description, are designated by the same reference numerals as in the preceding views. As shown in Figs. 6 and 7, pistons 117 which may be somewhat shorter than the pistons 16 in the modification first described, are employed, and the cylinders are provided with air inlet ports 118 which are below the skirt of the pistons when the piston is in its uppermost position and which are covered by the piston during its down stroke. The scavenging air is thus admitted into the crank case below the piston, instead of directly into the engine cylinders and, to inject the air into the firing chamber, the piston 117 is provided with a poppet valve 119, which closes an opening 120 through which air may be admitted from the under side of the piston into a swirl pocket 122 at the center of the piston head, the swirl pocket being provided with an opening 123 of reduced diameter to the top of the piston.

In order to provide a valve seat composed of a suitable metal, the swirl pocket 122 is preferably formed in a seat 124 in the form of a bronze casting which is integrally united with the piston head in the process of casting the piston. The pistons 117 are connected by means of tubular connecting rods 125 to a crank shaft 126 and a valve actuating rod 127 is slidably mounted in each of the connecting rods. Each valve 119 has a stem 128 which is slidably mounted in a spider 129 formed integrally with the seat 124 at the lower end thereof, and is provided at its lower end with an adjustable collar 130 screwed onto the valve stem and forming an enlarged head below the spider. The valve 119 is normally held in engagement with its seat by means of a tapering coil spring 131 interposed between the collar 130 at the lower end of the valve stem and the under side of the piston head. The actuating rod 127 has a rounded upper end bearing against the bottom of the head 130 of the valve stem and is guided adjacent its upper end in a sleeve 132 which connects the wrist pin to the connecting rod 125. The lower end of the valve actuating rod 127 is seated in a plunger 135 slidably mounted in the lower end of the connecting rod, and the plunger 135 is pressed toward a cam 136 on the crank shaft by means of a coil spring 137 interposed between the plunger 135 and the upper end of a sleeve 138 slipped within the lower end of the connecting rod and also held in place by the spring 137. The actuating rod 127 is pressed by the spring 131 against the cam on the crank shaft which is so disposed as to open the valve 119 when the piston 117 is at the bottom of its stroke, so that the air under pressure beneath the piston is admitted through the opening 120 to the swirl pocket 121 to supply a scavenging charge of air after the exhaust ports have been partly uncovered. Both the exhaust ports and the valve 119 remain open during the scavenging part of the stroke, the valve 119 closing slightly ahead of the exhaust ports.

In order to impart a whirling movement to the air as it enters the firing chamber, the valve 119 is provided with a spirally faced axial projection 139 which extends into the opening 123 when the valve 119 is in open position to impart a whirling movement to the air as it is forced under pressure past the valve and through the opening 123. The scavenging action is in this case substantially the same as in the modification first described.

The crankshaft 126 may be provided with a movably mounted counterweight 140 adapted to automatically absorb the shock of sudden energy impulses which may be caused by the fuel detonations in the firing chamber. Each of the counter weights 140 is supported by a swivel pin 141 mounted in a crank arm 142 by means of bolts 143 screwed into the swivel pin adjacent the ends thereof and projecting radially downwardly therefrom. The bolts 143 extend through slots 144 in the arms which permit limited turning movement of the bolts and swivel pin. Each counterweight is supported for limited pivotal movement on a pair of bolts 143 by means of crown washers 145 on the bolts which are supported by coil springs 146 on the bolts interposed between the washers 145 and the heads of the bolts. The counterweights 140 are normally held in alined position with respect to the bolts and crank shaft arms 142 by means of locating pins 147 on the lower end faces of the arms on opposite sides of the bolt.

Sudden energy impulses exerted on the crankshaft cause the spring counterweight to move away from the bottom faces of the arms, compressing the springs 146 and causing the counterweight to rock in one direction or the other with respect to the supporting bolts. A considerable portion of the energy of such sudden impulses, is thus absorbed by the spring supported counterweights which are quickly returned to their normal positions by the springs 146.

It will be apparent that the present invention provides an engine of the compression firing type which is of light weight and simple construction, which is easily controlled to increase or decrease its speed, which is efficient in operation and which can be manufactured at a relatively small cost.

It should be noted further that the present invention provides a fuel injection system which is positive in operation in which the fuel charge is measured with great accuracy, which is so designed that the fuel charge may be minutely varied to obtain the exact volume of fuel required for most efficient operation and which includes means by which the fuel charge can be quickly and easily varied to obtain the desired changes in the speed of the engine.

A very important advantage of the injector device of the present invention is that the entire injector and injector controlling mechanism for each cylinder is housed entirely within the head of the cylinder.

It will be seen also that the injector device is such that leakage is practically eliminated and there is no danger of variation in the volume of fuel charges due to expansion and contraction of pipes feeding the fuel to the engine cylinders, the entire measuring and injecting operation being performed by devices mounted within the head of the cylinder itself.

It should be further noted that the present invention provides a very efficient scavenging system which insures complete elimination of exhaust gases from the cylinder, and uniform and thorough mixing of the fuel charges in the air prior to each firing.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. In an engine of the character described, a plurality of cylinders having pistons therein, each cylinder having a fuel inlet orifice in the head thereof, exhaust ports and air inlet ports, a fuel injecting device on the head of each cylinder, each fuel injecting device including a pressure developing chamber having an orifice communicating with the inlet orifice of the cylinder and a fuel inlet port, a power actuated plunger in each chamber movable to open and close the inlet port, a hydraulically actuated plunger in each chamber for opening and closing the injection orifice, means including an air pump for supplying air under pressure to said air inlet port to scavenge the cylinder, means for simultaneously adjusting the power actuated plungers in said chambers to non-injecting positions, and means operated by said adjusting means to control said air supplying means to discontinue the supply of air under pressure to the cylinders simultaneously with the discontinuance of the supply of fuel to the cylinders.

2. In an engine of the character described, a plurality of cylinders having pistons therein, each cylinder having a fuel inlet orifice in the head thereof, exhaust ports and air inlet ports, a fuel injecting device on the head of each cylinder, each fuel injection device including a pressure developing chamber having a fuel inlet port and an orifice communicating with the inlet orifice of the cylinder, a power actuated plunger in each chamber movable to open and close the inlet port, a hydraulically actuated plunger in each chamber for opening and closing the injection orifice, means including an air pump having its outlet connected to said air inlet ports of the cylinders for supplying air under pressure in said cylinders to scavenge the same, means for simultaneously adjusting the power actuated plungers in said chambers in non-injecting position, a pressure release valve at the outlet of said air pump, and means operated by said plunger adjusting means to open and close said valve.

3. In an engine of the character described, a cylinder having a head and a wall provided with exhaust ports at a distance below the head and air inlet ports below the exhaust ports, means for injecting fuel through said head into said cylinder, a piston in said cylinder having a stroke toward and away from said head from a position close to the head to a position below the exhaust port, said piston having a head provided with a centrally disposed swirl pocket opening to the top thereof and tangential passages leading from said pocket to the periphery of the piston and adapted to be brought into registry with said air inlet ports, said piston head having narrow slots extending longitudinally of said passages and establishing communication between the passages and the top of the piston, and means for supplying air under pressure to said air inlet ports.

4. In an engine of the character described, a cylinder having a head and a wall provided with exhaust ports at a distance below the head and air inlet ports below the exhaust ports, a piston in said cylinder having a stroke toward and away from said head from a position close to the head to a position below the exhaust port, said piston having a head provided with a centrally disposed swirl pocket opening to the top thereof and tangential passages leading from said pocket to the periphery of the piston below the top thereof and adapted to be brought into registry with said air inlet port, means for injecting fuel through said cylinder head into said cylinder after closure of exhaust port by said piston, a piston ring on the piston between said passages and the top of the piston, and means for supplying air under pressure to said air inlet ports.

5. In an engine of the character described, a cylinder having a head and a wall provided with exhaust ports at a distance below the head and air inlet ports below the exhaust ports, means for injecting fuel through said head into said cylinder, a piston in said cylinder having a stroke toward and away from said head from a position close to the head to a position below the exhaust port, said piston having a head provided with a centrally disposed swirl pocket opening to the top thereof and tangential passages leading from said pocket to the periphery of the piston below the top thereof and adapted to be brought into registry with said air inlet port, said piston head having narrow slots extending longitudinally of said passages, said slot terminating short of the periphery of the piston head and establishing communication between said passages and the top of the piston, and means for supplying air under pressure to said air inlet port.

FRED A. TRUESDELL.